(12) United States Patent
Lee et al.

(10) Patent No.: US 7,611,324 B2
(45) Date of Patent: Nov. 3, 2009

(54) METHOD AND SYSTEM TO FACILITATE ENHANCED LOCAL COOLING OF TURBINE ENGINES

(75) Inventors: Ching-Pang Lee, Cincinnati, OH (US); Eric Alan Estill, Morrow, OH (US); James Harvey Laflen, Loveland, OH (US); Paul Hadley Vitt, Hamilton, OH (US); Michael Elliot Wymore, Madison, AL (US)

(73) Assignee: General Electric Company, Schenectady, NY (US)

( * ) Notice: Subject to any disclaimer, the term of this patent is extended or adjusted under 35 U.S.C. 154(b) by 587 days.

(21) Appl. No.: 11/565,273

(22) Filed: Nov. 30, 2006

(65) Prior Publication Data

US 2008/0131261 A1 Jun. 5, 2008

(51) Int. Cl.
*F01D 25/12* (2006.01)

(52) U.S. Cl. .................. 415/1; 415/173.1; 415/191; 415/199.5; 415/116

(58) Field of Classification Search .......... 415/1, 415/173.1, 191, 199.5, 116
See application file for complete search history.

(56) References Cited

U.S. PATENT DOCUMENTS

| | | | |
|---|---|---|---|
| 4,311,431 A * | 1/1982 | Barbeau | 415/173.6 |
| 4,317,646 A * | 3/1982 | Steel et al. | 415/116 |
| 4,522,557 A * | 6/1985 | Bouiller et al. | 415/115 |
| 4,949,545 A | 8/1990 | Shekleton | |
| 5,217,348 A | 6/1993 | Rup, Jr. et al. | |
| 5,511,945 A | 4/1996 | Glezer et al. | |
| 6,340,285 B1 | 1/2002 | Gonyou et al. | |
| 6,354,795 B1 | 3/2002 | White et al. | |
| 6,398,488 B1 | 6/2002 | Solda et al. | |
| 6,431,820 B1 | 8/2002 | Beacock et al. | |
| 6,431,832 B1 | 8/2002 | Glezer et al. | |
| 6,485,255 B1 | 11/2002 | Care et al. | |
| 6,779,597 B2 | 8/2004 | DeMarche et al. | |
| 6,984,100 B2 | 1/2006 | Bunker et al. | |
| 7,246,989 B2 * | 7/2007 | Glasspoole et al. | 415/1 |

* cited by examiner

*Primary Examiner*—Ninh H Nguyen
(74) *Attorney, Agent, or Firm*—William Scott Andes, Esq.; Armstrong Teasdale LLP

(57) ABSTRACT

A method of assembling a gas turbine engine is provided. The method includes coupling at least one turbine nozzle segment within the gas turbine engine. The at least one turbine nozzle segment includes at least one airfoil vane extending between an inner band and an outer band that includes an aft flange and a radial inner surface. The method also includes coupling at least one turbine shroud segment downstream from the at least one turbine nozzle segment, wherein the at least one turbine shroud segment includes a leading edge and a radial inner surface, coupling a cooling fluid source in flow communication with the at least one turbine nozzle segment such that cooling fluid channeled to each turbine nozzle outer band aft flange is directed at an oblique discharge angle towards the leading edge of the at least one turbine shroud segment, and channeling the cooling fluid through at least a first group of cooling openings having a larger aggregate cross-sectional area and a second group of cooling openings having a smaller aggregate cross-sectional area to facilitate preferential cooling of the turbine shroud.

20 Claims, 7 Drawing Sheets

METHOD AND SYSTEM TO FACILITATE ENHANCED LOCAL COOLING OF TURBINE ENGINES

STATEMENT REGARDING FEDERALLY SPONSORED RESEARCH & DEVELOPMENT

The U.S. Government may have certain rights in this invention pursuant to contract number N00019-04-C-0093.

BACKGROUND OF THE INVENTION

This invention relates generally to gas turbine engines and, more particularly, to methods and systems for cooling integral turbine nozzle and shroud assemblies.

One known approach to increase the efficiency of gas turbine engines requires raising the turbine operating temperature. However, as operating temperatures are increased, the thermal limits of certain engine components may be exceeded, resulting in reduced service life and/or material failure. Moreover, the increased thermal expansion and contraction of components may adversely affect component clearances and/or component interfitting relationships. Consequently, conventional cooling systems have been incorporated into gas turbine engines to facilitate cooling such components to avoid potentially damaging consequences when exposed to elevated operating temperatures.

It is known to extract, from the main airstream, air from the compressor for cooling purposes. To facilitate maintaining engine operating efficiency, the volume of cooling air extracted is typically limited to a small percentage of the total main airstream. As such, this requires that the cooling air be utilized with the utmost efficiency in order to facilitate maintaining the temperatures of components within safe limits.

For example, one component that is subjected to high temperatures is the shroud assembly located immediately downstream of the high pressure turbine nozzle extending from the combustor. The shroud assembly extends circumferentially about the rotor of the high pressure turbine and thus defines a portion of the outer boundary (flow path) of the main gas stream flowing through the high pressure turbine. Gas turbine engine efficiency may be negatively affected by a fluctuation in turbine blade tip clearance measured between a radially outer surface of the turbine blade and a radially inner surface of the shroud assembly. During transient engine operation, turbine blade tip clearance is a function of a difference in radial displacement of the turbine rotor blade and the shroud assembly. The turbine rotor typically has a larger mass than the stationary shroud system and, thus, during turbine operation, the turbine rotor typically has a slower thermal response than the shroud assembly. When the difference in the rotor blade radial displacement and the shroud assembly radial displacement is too great, the blade tip clearance is increased, which may result in reducing engine efficiency.

Moreoever, during engine operation, a gap may be defined between a trailing edge of the high pressure turbine nozzle outer band and a leading edge of the adjacent shroud segment. Cooling air, including, without limitation, nozzle leakage and/or purge flow, enters the gap and flows into the main gas stream channeled through the high pressure turbine. Cooling air is generally provided by a row of axially aligned cooling holes positioned in an outer band trailing edge that are directed towards the shroud leading edge forward face to facilitate cooling the end faces and purging the gap. Because known nozzle outer band trailing edges and shroud leading edges have a simple 90° corner, the gap opens directly into the main gas stream. During engine operation, as the main gas stream flows through the nozzle vanes, a circumferential gas pressure variation may be created downstream from the vane trailing edge. This circumferential gas pressure variation may cause localized hot gas ingestion into the gap between the outer band and the shroud segment. As a result, cooling air flowing through the gap may not effectively cool the downstream shroud segment.

BRIEF DESCRIPTION OF THE INVENTION

In one aspect, a method of assembling a gas turbine engine is provided. The method includes coupling at least one turbine nozzle segment within the gas turbine engine. The at least one turbine nozzle segment includes at least one airfoil vane extending between an inner band and an outer band that includes an aft flange and a radial inner surface. The method also includes coupling at least one turbine shroud segment downstream from the at least one turbine nozzle segment, wherein the at least one turbine shroud segment includes a leading edge and a radial inner surface, coupling a cooling fluid source in flow communication with the at least one turbine nozzle segment such that cooling fluid channeled to each turbine nozzle outer band aft flange is directed at an oblique discharge angle towards the leading edge of the at least one turbine shroud segment, and channeling the cooling fluid through at least a first group of cooling openings having a larger aggregate cross-sectional area and a second group of cooling openings having a smaller aggregate cross-sectional area to facilitate preferential cooling of the turbine shroud.

In another aspect, an engine assembly is provided. The engine assembly includes a nozzle assembly including an inner band, an outer band including an aft flange and a radial inner surface. The aft flange includes a first group of cooling openings having a larger aggregate cross-sectional area and a second group of cooling openings having a smaller aggregate cross-sectional area. The cooling openings are configured to direct cooling fluid therefrom at an oblique discharge angle. The assembly also includes at least one airfoil vane extending between the inner band and the outer band.

In yet another aspect, a gas turbine engine is disclosed. The gas turbine engine includes a nozzle assembly including an inner band, an outer band, and at least one airfoil vane extending between the inner band and the outer band. The outer band includes an aft flange and a radial inner surface. The aft flange includes a first group of cooling openings having a larger aggregate cross-sectional area and a second group of cooling openings having a smaller aggregate cross-sectional area. The cooling openings are configured to direct cooling fluid therefrom at an oblique discharge angle.

DETAILED DESCRIPTION OF THE INVENTION

The present invention provides a turbine shroud cooling system for minimizing hot gas ingestion into a gap defined between a trailing edge of the high pressure turbine nozzle and a leading edge of the adjacent shroud segment. The turbine shroud cooling system facilitates forming a barrier between the hot gas flow path flowing through the high pressure turbine and cooling air flowing through a gap defined between the turbine nozzle and the shroud segment.

Although the present invention is described below in reference to its application in connection with cooling a shroud assembly of an aircraft gas turbine, it should be apparent to those skilled in the art and guided by the teachings herein provided that with appropriate modification, the cooling system or assembly of the present invention can also be suitable to facilitate cooling other turbine engine components, such as, but not limited to, the nozzle and/or vane sections.

Figure 1:
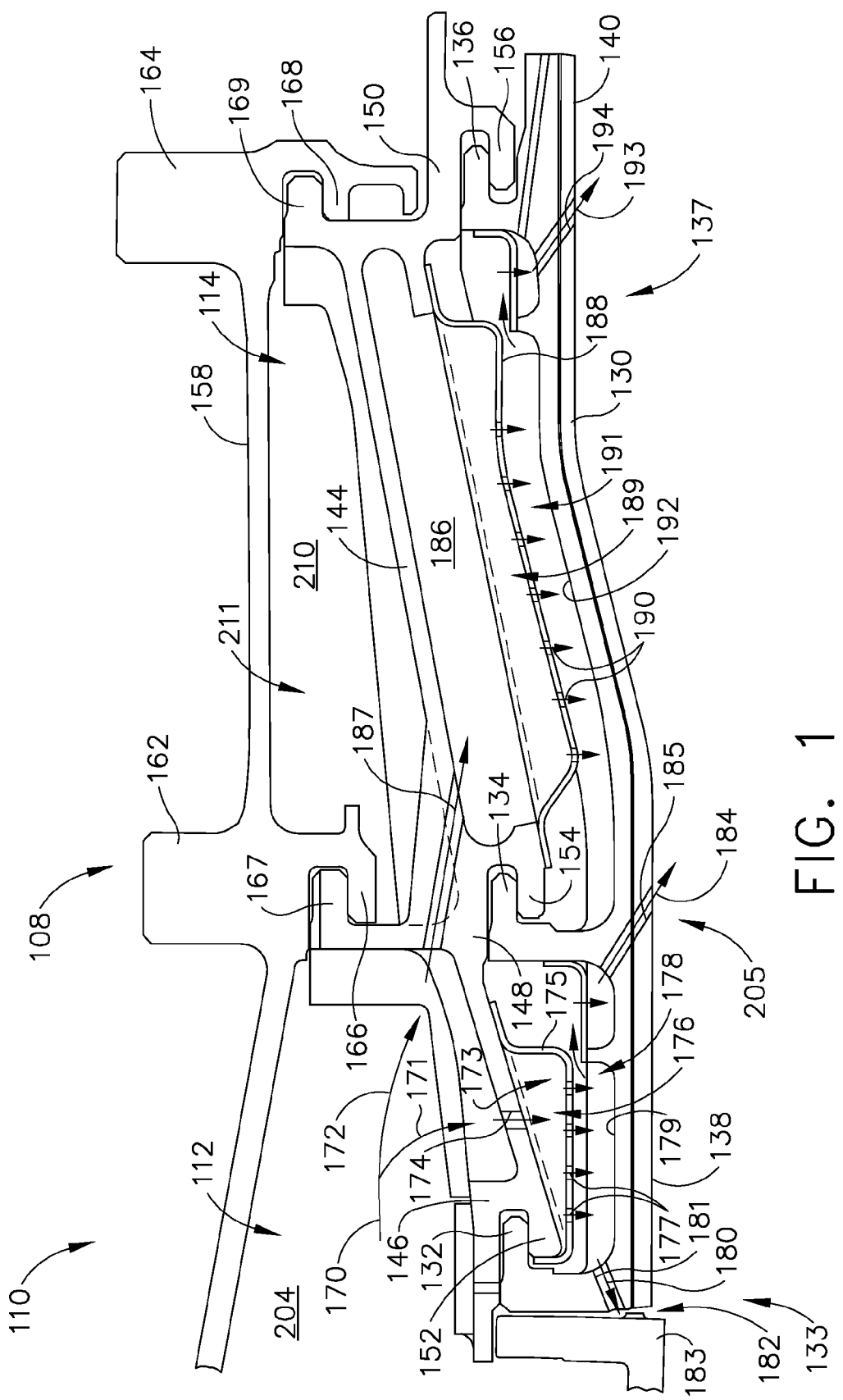
FIG. 1 is a side view of an exemplary shroud assembly schematically illustrating high pressure cooling air flow through the shroud assembly.
Figure 2:
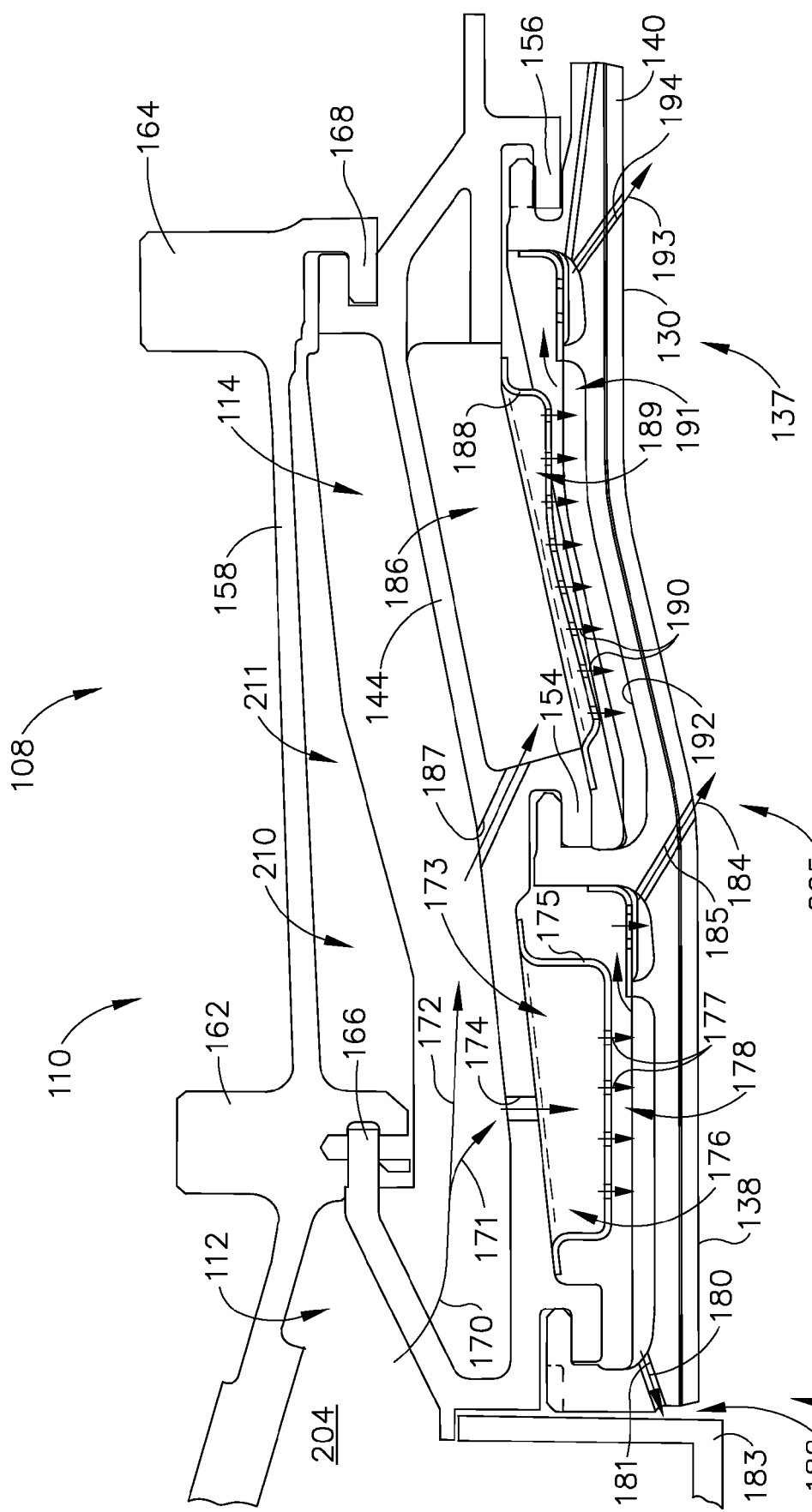
FIG. 2 is a side view of an alternative shroud assembly schematically illustrating high pressure cooling air flow through the shroud assembly.

FIG. 1 is a side view of an exemplary shroud assembly schematically illustrating high pressure cooling air flow through the shroud assembly. FIG. 2 is a side view of an alternative shroud assembly schematically illustrating high pressure cooling air flow through the shroud assembly. To facilitate controlling shroud assembly thermal response and/or shroud assembly displacement during transient engine operation, in the exemplary embodiment, a turbine engine cooling assembly 108 includes a shroud assembly, generally indicated as 110, for a high pressure turbine section 112 and a low pressure turbine section 114 of a gas turbine engine. It should be apparent to those skilled in the art and guided by the teachings herein provided that turbine engine cooling assembly 108 may be suitable to facilitate cooling other sections of the gas turbine engine, such as, but not limited to, a nozzle section and/or a vane section.

Shroud assembly 110 includes turbine engine cooling components in the form of shroud segments 130. Each shroud segment 130 includes a forward mounting hook 132 at a circumferential leading edge 133 of shroud segment 130. Shroud segment 130 also includes a midsection mounting hook 134 and an aft mounting hook 136 adjacent to a circumferential trailing edge 137 of shroud segment 130.

A plurality of shroud segments 130 are arranged circumferentially in a generally known fashion to form an annular segmented shroud. Shroud segments 130 define an annular clearance between high pressure turbine blades (not shown) and a radially inner surface 138 of a high pressure turbine section of shroud segments 130, and between low pressure turbine blades (not shown) and a radially inner surface 140 of a low pressure turbine section of shroud segment 130. A plurality of segmented shroud supports 144 interconnect shroud segments 130. Each shroud support 144 circumferentially spans and supports adjacent shroud segments 130. In alternative embodiments, shroud supports 144 are modified to support any suitable number of shroud segments 130 less than or greater than two shroud segments 130. In the exemplary embodiment, shroud assembly 110 includes twenty-six (26) shroud segments 130 and thirteen (13) shroud supports 144, although any suitable number of shroud segments 130 and/or shroud supports 144 may be utilized in alternative embodiments.

Each shroud support 144 includes a forward section 146, a midsection 148 and an aft section 150 that form respective forwardly projecting hangers 152, 154 and 156. Mounting hooks 132, 134 and 136 are received by cooperating hangers 152, 154 and 156, respectively, in tongue-in-groove, or hook-in-hanger, interconnections such that shroud support 144 supports respective shroud segments 130.

Shroud assembly 110 includes an annular shroud ring structure 158 that supports shroud supports 144. In one embodiment, shroud ring structure 158 is a one-piece, continuous annular shroud ring structure. A radial position of each shroud support 144, as well as of each shroud segment 130, is closely controlled by only two annular position control rings 162 and 164 formed on shroud ring structure 158. In contrast to conventional shroud ring structures, to facilitate reducing or limiting a weight of shroud assembly 110, shroud ring structure 158 includes only two position control rings 162 and 164. A midsection position control ring 162 includes an axially forwardly projecting hanger 166 that receives and/or cooperates with a rearwardly projecting mounting hook 167 formed by support structure midsection 148 in a first circumferential tongue-in-groove or hook-in-hanger interconnection. An aft position control ring 164 includes an axially forwardly projecting hanger 168 that receives and/or cooperates with a rearwardly projecting mounting hook 169 of support structure aft section 150 in second circumferential tongue-in-groove or hook-in-hanger interconnection.

In the exemplary embodiment, hangers 166 and/or 168 are in direct axial alignment, i.e., aligned generally in the same radial plane, with respective hanger 154 and hanger 156 to facilitate maximizing the radial support and/or radial position control provided to shroud support 144 and, thus, corresponding shroud segments 130. This alignment orientation facilitates increasing the rigidity of the entire shroud support assembly. In an alternative embodiment, shown in FIG. 2, hanger 166 and/or hanger 168 are in an offset axial alignment, i.e., not aligned generally in the same radial plane, with respective hanger 154 and hanger 156. In the exemplary embodiment, shroud ring structure 158 is bolted to the combustor case (not shown) at an aft end of shroud ring structure 158. Shroud ring structure 158 is cantilevered away from leading edge 133 at the combustor case interface. As such, midsection position control ring 162 is positioned several inches away from the combustor aft flange (not shown), and is thereby divorced from any non-uniform circumferential variations in radial deflection in the combustor case.

In the exemplary embodiment, high pressure cooling air 170 is extracted from a compressor (not shown) positioned upstream of shroud assembly 110. A first portion 171 of high pressure cooling air 170 extracted from the compressor facilitates cooling high pressure turbine section 112. A second portion 172 of high pressure cooling air 170 extracted from the compressor facilitates cooling low pressure turbine section 114. Referring further to FIG. 1, directional arrows corresponding to first portion 171 and second portion 172 illustrate at least a portion of a flow path of first portion 171 of high pressure cooling air 170 through a high pressure turbine section active convection cooling zone 173 and second portion 172 of high pressure cooling air 170 through a low pressure turbine section active convection cooling zone 186 (described below), respectively.

In this embodiment, first portion 171 of high pressure cooling air 170 is metered into a first or high pressure turbine section active convection cooling zone 173. More specifically, first portion 171 of high pressure cooling air 170 is metered through at least one high pressure turbine section (HPTS) feed hole 174 defined in shroud support 144. First portion 171 of high pressure cooling air 170 impinges against a pan-shaped HPTS impingement baffle 175 positioned within high pressure turbine section active convection cooling zone 173. Baffle 175 is coupled to shroud support 144 and thus at least partially defines an upper HPTS cavity or plenum 176. First portion 171 of high pressure cooling air 170 is then metered through a plurality of perforations 177 formed in impingement baffle 175 as cooling air into a lower HPTS cavity or plenum 178 defined in shroud segment 130, wherein the cooling air impinges against a backside 179 of shroud segment 130. A portion, such as spent impingement cooling air 180, of high pressure cooling air exits plenum 178 through a plurality of forwardly directed cooling openings 181 defined at, or near, shroud segment leading edge 133 configured to facilitate purging a gap 182 defined between high pressure turbine nozzle outer band 183 and shroud segment leading edge 133. A portion 184 of high pressure cooling air is metered through a plurality of rearwardly directed cooling openings 185 defined in shroud segment 130 to facilitate film cooling inner surface 138 and/or 140. Spent impingement cooling air 180 of high pressure cooling air exiting cooling openings 181 facilitates preventing or limiting hot gas injection or recirculation into shroud assembly 110 at leading edge 133.

Second portion 172 of high pressure cooling air 170 extracted from the compressor facilitates cooling low pressure turbine section 114. In this embodiment, second portion 172 of high pressure cooling air 170 is metered into a second or low pressure turbine section active convection cooling zone 186. More specifically, second portion 172 of high pressure cooling air 170 is metered through at least one low pressure turbine feed hole 187 defined in shroud support 144. Second portion 172 of high pressure cooling air 170 impinges against a pan-shaped Low Pressure Turbine Section impingement baffle 188 positioned within low pressure turbine section active convection cooling zone 186. Baffle 188 is coupled to shroud support 144, and thus at least partially defines an upper LPTS cavity or plenum 189. Second portion 172 of high pressure cooling air 170 is then metered through perforations 190 defined in impingement baffle 188 and into a lower LPTS cavity or plenum 191 wherein high pressure cooling air impinges against a backside 192 of shroud segment 130. Cooling air 193 exits plenum 191 through a plurality of rearwardly directed cooling openings 194 defined through shroud segment 130, to facilitate film cooling radially inner surface 140 of trailing edge 137 of shroud segment 130 downstream.

As shown in FIG. 1, high pressure cooling air 170 is initially directed into a duct 204 defined at least partially between high pressure turbine nozzle outer band 183 and the portion of shroud ring structure 158 forming midsection position control ring 162. High pressure cooling air 170 is separated within duct 204 into first portion 171, and into second portion 172, as high pressure cooling air 170 is directed through duct 204. First portion 171 of high pressure cooling air 170 is metered through HPTS feed holes 174 into active convection cooling zone 173 and into plenum 178 to facilitate impingement cooling in high pressure turbine section 112. Spent impingement cooling air 180 exits shroud segment 130 through shroud segment leading edge cooling openings 181 to facilitate purging gap 182 defined between high pressure turbine nozzle outer band 183 and shroud segment 130, and/or through cooling openings 185 defined at a trailing end 205 of high pressure turbine section 112 to facilitate film cooling inner surface 138 and/or 140 of shroud segment 130.

Second portion 172 of high pressure cooling air 170 is directed into second active convection cooling zone 186 that is defined at least partially between shroud support 144 and shroud segment 130, and between midsection position control ring 162 and aft position control ring 164. Second portion 172 of high pressure cooling air 170 facilitates cooling low pressure turbine section 114. In one embodiment, second portion 172 of high pressure cooling air 170 is metered through a plurality of low pressure turbine feed holes 187 defined in shroud support 144. More specifically, second portion 172 of high pressure cooling air 170 is metered directly into active convection cooling zone 186 to facilitate shroud segment impingement cooling in low pressure turbine section 114, such that cooling air bypasses a third region 210 defining an inactive convection cooling zone 211 between shroud support 144 and shroud ring structure 158, and between midsection position control ring 162 and aft position control ring 164. Spent impingement cooling air exits shroud segment 130 through cooling openings 194 defined at or near trailing edge 137 of shroud segment 130.

In the flow path illustrated in FIG. 1, high pressure turbine section active convection cooling zone 173 and/or low pressure turbine section active convection cooling zone 186 are directly and actively cooled. Low pressure turbine section inactive convection cooling zone 211 is inactive, i.e., no high pressure cooling air flows through inactive convection cooling zone 211. Thus, a thermal response within inactive convection cooling zone 211 to environmental conditions created during transient engine operation is reduced and/or retarded. As a result, transient displacement of midsection position control ring 162 and/or aft position control ring 164 is also reduced and/or retarded.

As shown in FIG. 2, high pressure cooling air 170 is directed into duct 204 defined at least partially between high pressure turbine nozzle outer band 183 and shroud ring structure 158 forming midsection position control ring 162. High pressure cooling air 170 is separated into first portion 171 and second portion 172. First portion 171 of high pressure cooling air 170 is metered through HPTS feed hole(s) 174 into high pressure turbine section active convection cooling zone 173 at least partially defining plenum 176 and plenum 178 to facilitate shroud segment impingement cooling in high pressure turbine section 112. Spent impingement cooling air 180 exits shroud segment 130 through shroud segment leading edge cooling openings 181 to facilitate purging gap 182 between high pressure turbine nozzle outer band 183 and shroud segment 130 and/or through cooling openings 185 defined at trailing end 205 of high pressure turbine section 112 to facilitate film cooling inner surface 138 and/or 140.

Second portion 172 of high pressure cooling air 170 is directed into low pressure turbine section active convection cooling zone 186 defined at least partially between shroud support 144 and shroud segment 130, and between midsection position control ring 162 and aft position control ring 164 to facilitate cooling low pressure turbine section 114. In one embodiment, second portion 172 of high pressure cooling air 170 is metered through a plurality of low pressure turbine feed holes 187 defined through shroud support 144. Second portion 172 of high pressure cooling air 170 is metered directly into low pressure turbine section active convection cooling zone 186 at least partially defining plenum 189 and plenum 191 to facilitate shroud segment impingement cooling in low pressure turbine section 114. Spent impingement cooling air 193 exits shroud segment 130 through cooling openings 194 defined at or near trailing edge 137 of shroud segment 130.

The shroud cooling assembly as shown in FIGS. 1 and 2 directs high pressure cooling air directly into high pressure turbine section active convection cooling zone 173 and/or low pressure turbine section active convection cooling zone 186 through respective feed hole(s) 174 and feed hole(s) 187.

In the shroud cooling assembly as shown in FIGS. 1 and 2, high pressure cooling air is not metered or directed through low pressure turbine section inactive convection cooling zone 211. As a result, the components defining low pressure turbine section inactive convection cooling zone 211 respond relatively slower to thermal conditions and/or environments during transient engine operation than the components defining an active convection cooling zone within conventional shroud cooling assemblies. This slower response to thermal conditions and/or environments facilitates relatively slower transient displacement of midsection position control ring 162 and/or aft position control ring 164.

Thus, by bypassing the low pressure turbine section shroud ring structure, the high pressure cooling air flow paths shown in FIGS. 1 and 2 facilitate reducing and/or retarding the transient thermal response and/or displacement of the shroud segment during transient engine operation. The slower response further facilitates improved blade tip clearance and turbine engine efficiency.

Figure 3:
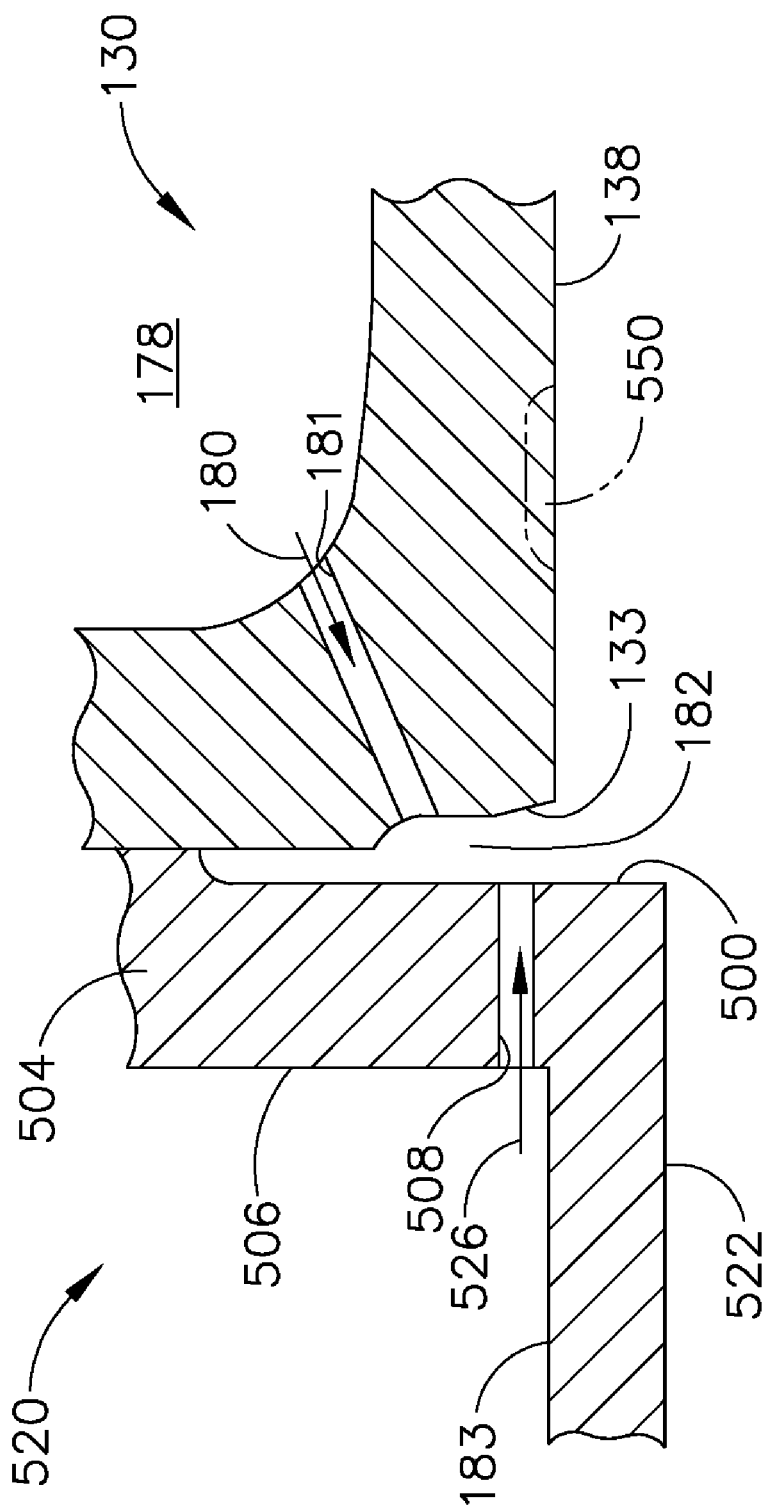
FIG. 3 is an enlarged schematic cross-sectional view of a gap defined between a turbine nozzle and the shroud assembly shown in FIG. 1 or 2.

FIG. 3 is an enlarged schematic cross-sectional view of turbine nozzle band 183, gap 182 and shroud segment leading edge 133. Turbine nozzle outer band 183 is included as part of a turbine nozzle segment 520. Turbine nozzle segments 520 generally include a plurality of circumferentially-spaced airfoil vanes 510, shown in FIG. 4. The vanes 510 extend between radial outer band 183 and a radial inner band (not shown). In the exemplary embodiment, outer band 183 includes a radial inner surface 522 and an aft flange 504. Aft flange 504 includes an upstream face 506, trailing edge 500, and a plurality of cooling openings 508 that extend from face 506 to trailing edge 500. Cooling openings 508 are oriented to facilitate channeling cooling air 526 towards shroud segment leading edge 133 and to facilitate purging gap 182 of migrating hot gases that have migrated into gap 182.

Figure 4:
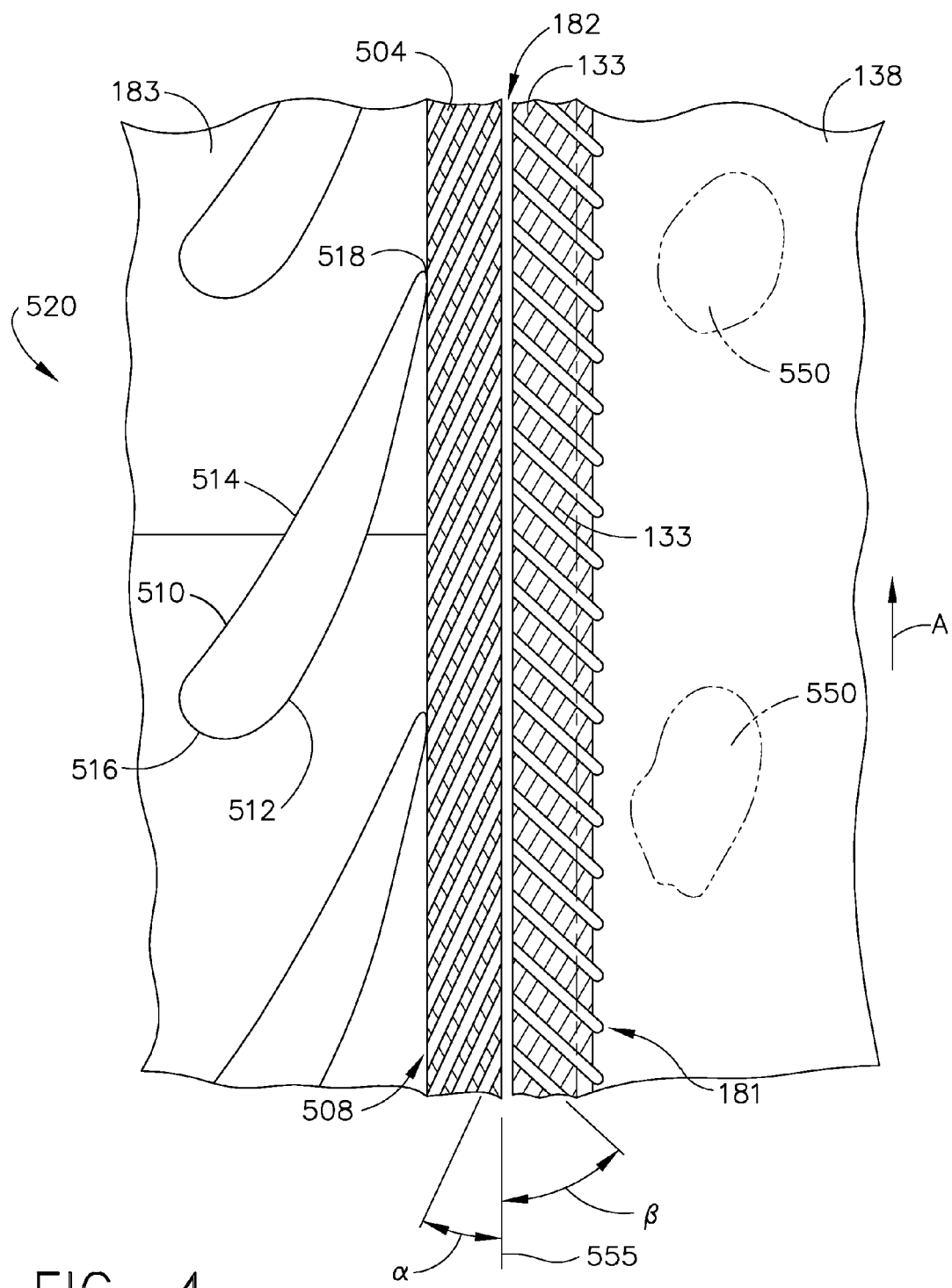
FIG. 4 is a plan view of the turbine nozzle and shroud assembly shown in FIG. 3, illustrating an exemplary cooling hole pattern.

FIG. 4 is a schematic plan view of turbine nozzle outer band 183, outer band aft flange 504, gap 182, and shroud assembly leading edge 133. More specifically, as shown in FIG. 4, aft flange cooling openings 508 extend obliquely through aft flange 504 and shroud segment leading edge openings 181 extend obliquely through shroud segment leading edge 133. In the exemplary embodiment, each nozzle segment 520 includes at least one airfoil vane 510 that includes a first sidewall 512 and a second sidewall 514. In the exemplary embodiment, first sidewall 512 is convex and defines a suction side of each airfoil vane 510, and second sidewall 514 is concave and defines a pressure side of each airfoil vane 510. Sidewalls 512 and 514 are joined together at a leading edge 516 and at an axially-spaced trailing edge 518 of each airfoil vane 510. Each airfoil trailing edge 518 is spaced chordwise and downstream from each respective airfoil leading edge 516. First and second sidewalls 512 and 514, respectively, extend longitudinally, or radially outwardly, in span from a radially inner band (not shown) to radially outer band 183.

Each vane 510 has airfoil contours (not shown) from leading edge 516 toward trailing edge 518. As the hot combustion gases flow around airfoil vanes 510, the gases along sidewall 512 accelerate and create a lower static pressure and the gases along sidewall 514 decelerate and create a higher static pressure. During engine operation, hot combustion gases are channeled between vanes 510 and bands 183 and form a pair of passage vortices from sidewall 514 toward sidewall 512 on the surfaces of the inner band (not shown) and outer band 183. The passage vortices bring the hotter combustion gases from the mid-span core flow toward the inner band (not shown) and outer band 183. There are periodic pressure variations along the circumferential direction at the turbine nozzle outer band trailing edge 500. The combination of the passage vortex and the circumferential pressure variation at shroud leading edge 133 result in circumferentially periodic local hot spots 550 developing on shroud inner surface 138. Over time, such hot spots 550 may reduce an overall performance of the engine assembly and/or reduce a durability of the engine.

Cooling openings 508 are obliquely-oriented in outer band aft flange 504 relative to trailing edge 500 such that cooling flow discharged from openings 508 is discharged at a discharge angle $\alpha$ generally in the direction of rotation indicated by arrow A. In the exemplary embodiment, discharge angle $\alpha$ is oblique and as such is not parallel to a flow of combustor gases through turbines 112 and 114. More specifically, all cooling openings 508 are obliquely-oriented at the same discharge angle $\alpha$. Alternatively, any of openings 508 may be uniformly obliquely-oriented at any discharge angle $\alpha$ that enables cooling openings 508 to function as described herein. In the exemplary embodiment, openings 508 are spaced circumferentially equidistantly across outer band trailing edge 500. Moreover, in the exemplary embodiment, openings 508 are all sized and obliquely-oriented identically. It should be appreciated that although cooling openings 508 illustrated in the exemplary embodiment are sized identically and are uniformly spaced across trailing edge 500 of turbine nozzle outer band 183, in alternative embodiments, cooling openings 508 may have any size, shape, or orientation that enables cooling openings 508 to function as described herein.

In the exemplary embodiment, cooling openings 181 extend through shroud assembly leading edge 133 and are obliquely-oriented to discharge cooling fluid at a discharge angle $\beta$ measured with respect to a centerline 555 of gap 182. In the exemplary embodiment, discharge angle $\beta$ is oblique and as such flow discharged from openings 181 is not parallel to a flow of combustion gases through turbines 112 and 114. More specifically, in the exemplary embodiment, cooling openings 181 are uniformly obliquely-oriented at discharge angle $\beta$ in the direction of arrow A. Alternatively, any of openings 181 may be uniformly obliquely-oriented at any discharge angle $\beta$ that enables cooling openings 181 to function as described herein. In the exemplary embodiment, openings 181 are spaced circumferentially equidistantly across shroud assembly leading edge 133. Moreover, in the exemplary embodiment, openings 181 are all sized and oriented identically. It should be appreciated that although cooling openings 181 illustrated in the exemplary embodiment are sized identically and are uniformly spaced across the leading edge 133 of shroud assembly 110, in alternative embodiments, cooling openings 181 may have any size, shape, or orientation that enables cooling openings 181 to function as described herein.

In the exemplary embodiment, cooling openings 508 are each substantially aligned with a respective one of cooling openings 181 located across gap 182. It should be appreciated that although cooling openings 508 are substantially aligned with respective cooling openings 181 in the exemplary embodiment, in other embodiments, cooling openings 508 are not required to align with respective cooling openings 181, and instead may be offset by any distance from respective cooling openings 181 that enables cooling openings 508 and 181 to function as described herein. Additionally, in the exemplary embodiment, discharge angles $\alpha$ and $\beta$ have the same magnitude. It should be appreciated that although angles $\alpha$ and $\beta$ are described as having the same magnitude in the exemplary embodiment, in other embodiments, cooling openings 508 and 181 may be oriented at different angles α and β, respectively.

During operation, the oblique orientation of cooling openings 508 and 181 imparts a clockwise, or tangential, velocity component to air channeled through cooling openings 508 and 181. As a result, cooling flow energy is facilitated to be enhanced because little energy is lost in turning the cooling air through misaligned cooling openings. The clockwise momentum of the air facilitates balancing the pressure distribution inside gap 182, such that hot gas ingestion into gap 182 is reduced.

Moreover, the oblique orientation and location of cooling openings 508 and 181 about turbine nozzle assembly 520 facilitates reducing hot gas ingestion into gap 182 and facilitates improving film cooling across shroud inner surface 138 downstream from leading edge 133. The orientation and location of cooling openings 508 and 181 facilitates increasing the length of cooling openings 508 and 181, thus increasing the convective cooling ability of openings 508 and 181 within each outer band 183 and shroud assembly 110.

Figure 5:
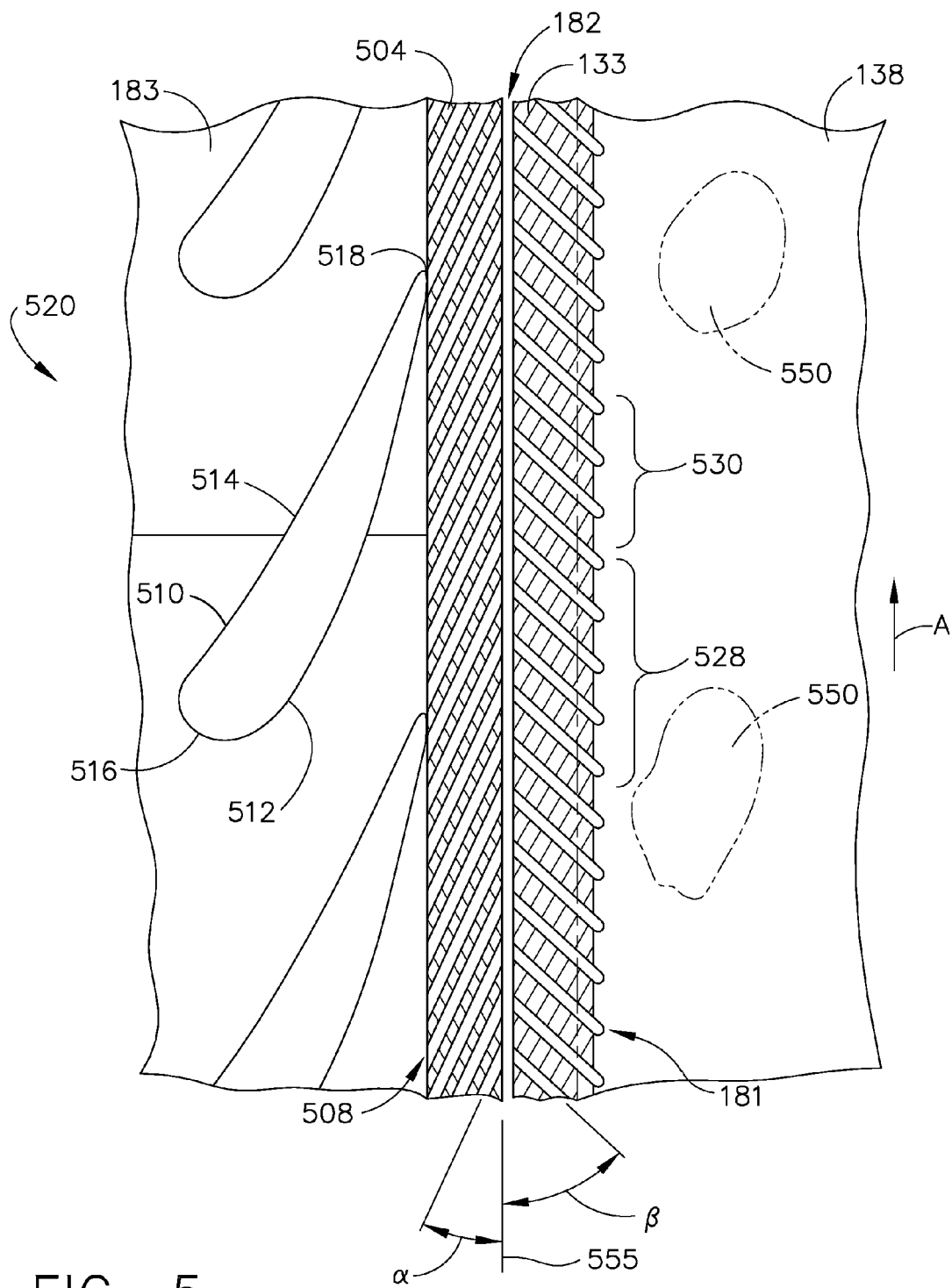
FIG. 5 is a plan view of the turbine nozzle and shroud assembly shown in FIG. 3, illustrating an alternative exemplary cooling hole pattern.
Figure 6:
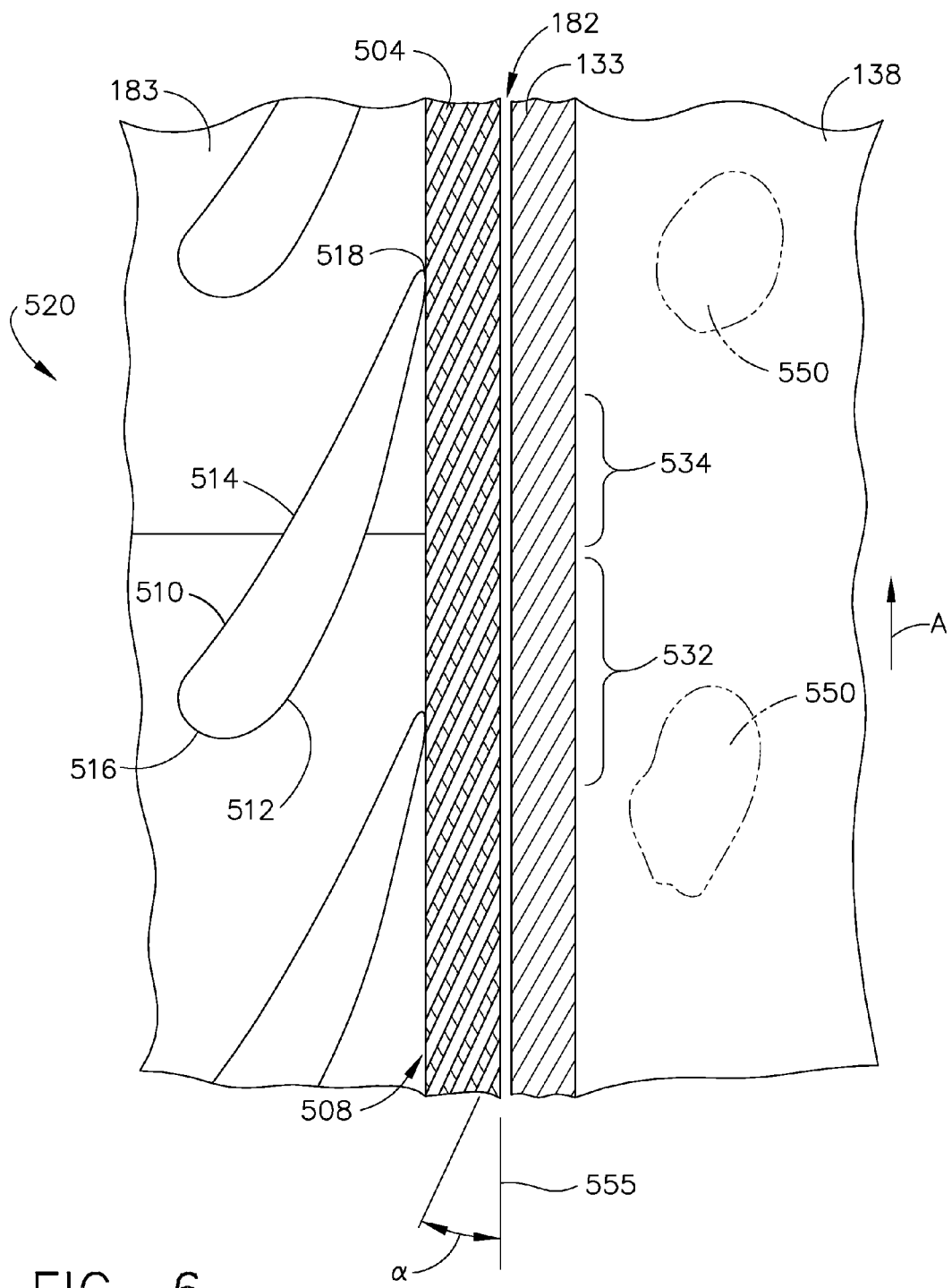
FIG. 6 is a plan view of the turbine nozzle and shroud assembly shown in FIG. 3, illustrating another alternative exemplary cooling hole pattern.
Figure 7:
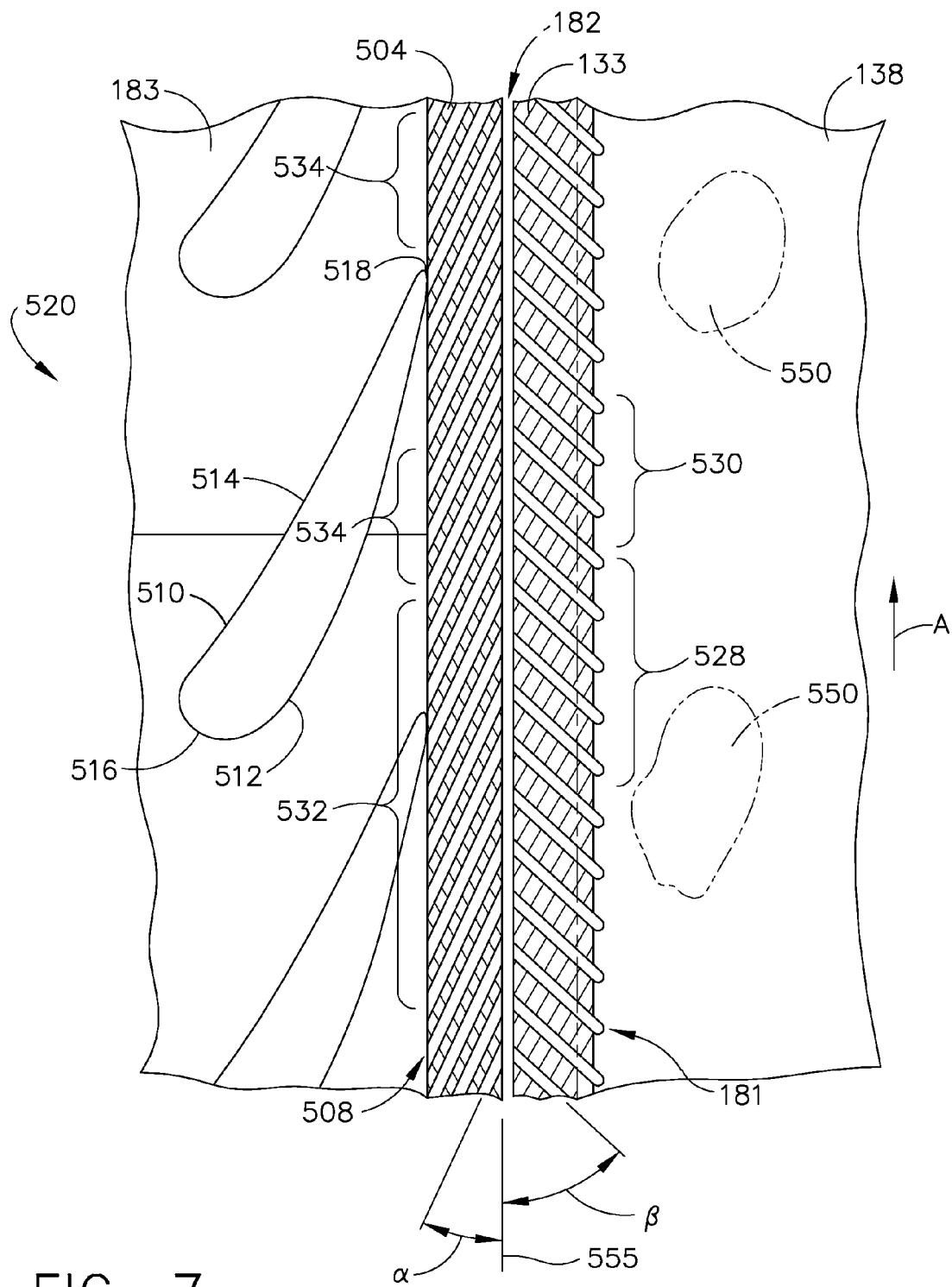
FIG. 7 is a plan view of the turbine nozzle and shroud assembly shown in FIG. 3, illustrating yet another alternative exemplary cooling hole pattern.

FIG. 5 is a schematic plan view of turbine nozzle outer band 183, outer aft flange 504, gap 182 and shroud assembly leading edge 133, illustrating an alternative embodiment of cooling openings 181 and 508. FIG. 6 is a schematic plan view of turbine nozzle outer band 183, outer aft flange 504, gap 182 and shroud assembly leading edge 133, illustrating another alternative embodiment of cooling openings 181 and 508. FIG. 7 is a schematic plan view of turbine nozzle outer band 183, outer aft flange 504, gap 182 and shroud assembly leading edge 133, illustrating yet another alternative embodiment of cooling openings 181 and 508. The engine assembly shown in FIGS. 5, 6, and 7 is the same engine assembly shown in FIG. 4, with the exception of a few component changes, described in more detail below. As such, components illustrated in FIGS. 5, 6, and 7 that are identical to components illustrated in FIG. 4, are identified in FIGS. 5, 6, and 7 using the same reference numerals used in FIG. 4.

With respect to FIG. 5, cooling openings 508 extend obliquely through outer band aft flange 504 and two different groups 528 and 530 of cooling openings 181 extend obliquely through shroud assembly leading edge 133. During operation, hot spots 550 may develop on shroud inner surface 138 that may require enhanced local cooling. Consequently, in this alternative embodiment, at least one group 528 of larger diameter cooling openings 181 is positioned upstream from each corresponding hot spot 550. Openings 181 in group 528 facilitate preferential cooling by channeling cooling fluid towards each corresponding hot spot 550. It should be appreciated that hot spot 550 locations may vary between engines and the locations of groups 528 will vary accordingly. In the exemplary embodiment, a group 530 of small diameter cooling openings 181 is positioned between circumferentially-spaced groups 528 of larger diameter cooling openings 181. More specifically, the relative locations of groups 530 correspond to areas of shroud inner surface 138 that are downstream from leading edge 133 and that are subjected to relatively lower operating temperatures in comparison to hot spots 550. Thus, in the exemplary embodiment of FIG. 5, cooling opening groups 528 and 530 may be positioned to enhance a flow of cooling fluid provided to hotter regions of inner surface 138 while minimizing a flow of cooling fluid provided to cooler regions of inner surface 138, thereby facilitating reducing hot spot development on shroud inner surface 138. It should be appreciated that the term "fluid" as used herein includes any cooling material or medium that flows, including but not limited to, gas, air and liquids, as described herein.

With respect to the embodiment illustrated in FIG. 6, at least one group 532 of larger diameter cooling openings 508 is positioned upstream from each corresponding hot spot 550, to facilitate preferential cooling of each corresponding hot spot 550. It should be understood that in this embodiment, shroud assembly leading edge 133 does not include cooling openings 181. It should also be appreciated that hot spot 550 locations may vary between engines and as such, locations of groups 532 will vary accordingly. In the exemplary embodiment, a group 534 of small diameter cooling openings 508 is positioned between circumferentially-spaced groups 532 of larger diameter cooling openings 508. More specifically, the relative locations of groups 534 correspond to areas of shroud inner surface 138 that are downstream from leading edge 133 and that are subjected to relatively lower operating temperatures in comparison to hot spots 550. Thus, in the exemplary embodiment of FIG. 6, cooling opening groups 532 and 534 may be positioned to enhance a flow of cooling fluid provided to hotter regions of inner surface 138 while minimizing a flow of cooling fluid provided to cooler regions of inner surface 138, thereby facilitating reducing hot spot development on shroud inner surface 138.

With respect to the embodiment illustrated in FIG. 7, the cooling opening patterns shown in FIGS. 5 and 6 are essentially combined. More specifically, groups 528 and 532 of larger diameter cooling openings 181 and 508, respectively, are positioned upstream from each corresponding hot spot 550, to facilitate preferential cooling by channeling cooling fluid towards each corresponding hot spot 550. Groups 528 and 532 are positioned to cooperate with each other across opposite sides of gap 182. Likewise, groups 530 and 534 are positioned to cooperate with each other across opposite sides of gap 182. It should be appreciated that hot spot 550 locations may vary between engines and the locations of groups 528 and 532 will vary accordingly. In the exemplary embodiment, groups 530 and 534 of small diameter cooling openings 181 and 508, respectively, are positioned between circumferentially-spaced groups 528 and 532, respectively, of large diameter cooling openings 181 and 508, respectively. Moreover, the relative locations of groups 530 and 534 correspond to areas of shroud inner surface 138 that are downstream from leading edge 133 and that are subjected to relatively lower temperatures in comparison to hot spots 550. Thus, in the exemplary embodiment of FIG. 7, groups 528, 530, 532 and 534 may be positioned to enhance a flow of cooling fluid provided to hotter regions of inner surface 138 while minimizing a flow of cooling fluid provided to cooler regions of inner surface 138, thereby reducing hot spot development on shroud inner surface 138.

It should be appreciated that large diameter cooling openings 181 and 508 of groups 528 and 532, respectively, may be any diameter that enables groups 528 and 532 to function as described herein. Moreover, it should be appreciated that small diameter cooling openings 181 and 508 of groups 530 and 534, respectively, may be any diameter that enables groups 530 and 534 to function as described herein.

It should be appreciated that although the aforementioned exemplary embodiments describe patterns of cooling openings 181 and 508 within groups 528 and 530, and 532 and 534, respectively, other embodiments may use different patterns of cooling openings 181 and 508 within respective groups 528 and 530, and 532 and 534. More specifically, other embodiments may facilitate preferential cooling of hot spots 550 by adjusting, in any manner, the aggregate cross-sectional area available for channeling cooling fluid to hot spots 550 within each group 528, 530, 532 and 534. For example, other embodiments may use the same diameter for cooling openings 181 and 508 within respective groups 528 and 530, and 532 and 534, and at the same time increase or decrease the density of cooling openings 181 and 508 within respective groups 528 and 530, and 532 and 534. Consequently, to increase cooling flow through any of groups 528, 530, 532 and 534, the density of respective cooling openings 181 and 508 is increased. To decrease cooling flow through any one of groups 528, 530, 532 and 534, the density of respective cooling openings 181 and 508 is decreased. Thus, by adjusting the density of cooling openings 181 and 508 within respective groups 528 and 530, and 532 and 534, the aggregate cross-sectional area is also adjusted and preferential cooling of hot spots 550 is facilitated.

In another example of adjusting the aggregate cross-sectional area provided for channeling cooling fluid, groups 528 and 532 may include any number of large diameter cooling openings 181 and 508, respectively, at any cooling opening spacing, that enables groups 528 and 532 to function as described herein. Likewise, groups 530 and 534 may include any number of small diameter cooling openings 181 and 508, respectively, at any cooling opening spacing, that enables groups 530 and 534 to function as described herein.

In yet another example of adjusting the aggregate cross-sectional area provided for channeling cooling fluid, groups 528 and 532 may include an increased density of large diameter cooling holes 181 and 508, respectively, that enables groups 528 and 532 to function as described herein. Similarly, the aggregate cross-sectional area provided for channeling cooling fluid, groups 530 and 534 may include a decreased density of small diameter cooling holes 181 and 508, respectively, that enables groups 528 and 532 to function as described herein.

It should be appreciated that although the exemplary embodiments describe cooling openings 181 and 508 as having circular cross-sections, other embodiments may use any cross-sectional area for cooling openings 181 and 508 that enables respective groups 528 and 530, and 532 and 534, to function as described herein. Such cross-sectional areas include, but are not limited to, oval, square and rectangle. It should be appreciated that cooling openings 181 and 508 of respective groups 528 and 532 are positioned upstream of hot spot 550. However, due to the oblique gas flow exiting from vanes 510, openings 181 and 508 are not necessarily axially aligned with the engine.

The above-described turbine nozzle segments and shroud segments include a plurality of obliquely-oriented cooling openings extending along an aft flange of the turbine nozzle outer band and along a leading edge of the turbine shroud assembly. More specifically, cooling openings extend through the aft flange of the outer band and through the leading edge of the turbine shroud assembly, such that groups of cooling openings having a greater aggregate cross-sectional area are positioned upstream of local hot spots and groups of cooling openings having a smaller aggregate cross-sectional area are positioned between the groups having greater aggregate cross-sectional area. As a result, cooling fluid is directed into a gap defined between the aft flange and leading edge to facilitate reducing hot gas ingestion into the gap, and to facilitate enhanced local cooling by distributing cooling fluid to hot spots on the shroud inner surface. Accordingly, the turbine nozzle segments and shroud segments are operable at a reduced operating temperature, thus facilitating extending the durability and useful life of the turbine nozzle segments and shroud segments, and reduces the operating cost of the engine.

Exemplary embodiments of turbine nozzle segments and shroud segments are described above in detail. The segments are not limited to the specific embodiments described herein, but rather, components of each segment may be utilized independently and separately from other components described herein.

While the invention has been described in terms of various specific embodiments, those skilled in the art will recognize that the invention can be practiced with modification within the spirit and scope of the claims.

What is claimed is:

1. A method of assembling a gas turbine engine, said method comprising:
    coupling at least one turbine nozzle segment within the gas turbine engine, wherein the at least one turbine nozzle segment includes at least one airfoil vane extending between an inner band and an outer band that includes an aft flange and a radial inner surface;
    coupling at least one turbine shroud segment downstream from the at least one turbine nozzle segment, wherein the at least one turbine shroud segment includes a leading edge and a radial inner surface;
    coupling a cooling fluid source in flow communication with the at least one turbine nozzle segment such that cooling fluid channeled to each turbine nozzle outer band aft flange is directed at an oblique discharge angle towards the leading edge of the at least one turbine shroud segment; and
    channeling the cooling fluid through at least a first group of cooling openings having a first aggregate cross-sectional area and a second group of cooling openings having a second aggregate cross-sectional area, the first aggregate cross-sectional area is larger than the second cross-sectional area, to facilitate preferential cooling of the turbine shroud.

2. A method in accordance with claim 1 wherein said coupling a cooling fluid source in flow communication with the at least one turbine nozzle segment further comprises coupling the cooling fluid source to the turbine nozzle segment such that cooling fluid is channeled into a gap defined between the aft flange and the leading edge.

3. A method in accordance with claim 1 wherein channeling the cooling fluid further comprises channeling cooling fluid through the first group of openings to facilitate enhanced cooling fluid flow to hotter portions of the shroud segment inner surface.

4. A method in accordance with claim 1 wherein channeling the cooling fluid further comprises channeling cooling fluid through the second group of openings to facilitate reducing cooling fluid flow to cooler portions of the shroud segment inner surface.

5. A method in accordance with claim 1 further comprising forming the first group of cooling openings from a plurality of cooling openings having a first diameter and forming the second group of cooling openings from a plurality of cooling openings having a second diameter, the first diameter is larger than the second diameter.

6. A method in accordance with claim 1 further comprising forming the first group of cooling openings from a first density of cooling openings and forming the second group of cooling openings from a second density of cooling openings, the first density of cooling openings is greater than the second density of cooling openings.

7. An engine assembly comprising:

a nozzle assembly comprising:

an inner band;

an outer band comprising an aft flange and a radial inner surface, said aft flange comprising a first group of cooling openings having a first aggregate cross-sectional area and a second group of cooling openings having a second aggregate cross-sectional area, said first aggregate cross-sectional area is larger than said second aggregate cross-sectional area, the cooling openings configured to direct cooling fluid therefrom at an oblique discharge angle; and at least one airfoil vane extending between said inner band and said outer band.

8. An engine assembly in accordance with claim 7 further comprising a shroud assembly, said shroud assembly comprising a shroud inner surface and a shroud assembly leading edge, said shroud assembly leading edge comprising a first shroud group of cooling openings having a third aggregate cross-sectional area and a second shroud group of cooling openings having a fourth aggregate cross-sectional area, said third aggregate cross-sectional area is larger than said fourth aggregate cross-sectional area, said cooling openings configured to discharge cooling fluid therefrom at an oblique angle with respect to a centerline of a gap defined between said outer band aft flange and said shroud assembly leading edge.

9. An engine assembly in accordance with claim 8 wherein said first group of cooling openings and said first shroud group of cooling openings include a plurality of cooling openings having a first diameter.

10. An engine assembly in accordance with claim 9 wherein said second group of cooling openings and said second shroud group of cooling openings include a plurality of cooling openings having a second diameter, said first diameter is larger than said second diameter.

11. An engine assembly in accordance with claim 8 wherein said first group of openings and said first shroud group of openings include a plurality of densely oriented cooling holes.

12. An engine assembly in accordance with claim 11 wherein said second group of openings and said second shroud group of openings include a plurality of cooling holes less densely oriented than said first group of openings and said first shroud group of openings.

13. An engine assembly in accordance with claim 8 wherein said first group of cooling openings and said second group of cooling openings facilitate reducing hot gas ingestion into a gap defined between said outer band aft flange and said shroud assembly leading edge.

14. An engine assembly in accordance with claim 8 wherein said first group of cooling openings and said first shroud group of cooling openings facilitate film cooling of said shroud inner surface.

15. A gas turbine engine comprising a nozzle assembly comprising an inner band, an outer band, and at least one airfoil vane extending between said inner band and said outer band, said outer band comprising an aft flange and a radial inner surface, said aft flange comprising a first group of cooling openings having a first aggregate cross-sectional area and a second group of cooling openings having a second aggregate cross-sectional area, said first aggregate cross-sectional area is larger than said second aggregate cross-sectional area, said cooling openings configured to direct cooling fluid therefrom at an oblique discharge angle.

16. A gas turbine engine in accordance with claim 15 further comprising a shroud assembly, said shroud assembly comprising a shroud inner surface and a shroud assembly leading edge, said shroud assembly leading edge comprising a first shroud group of cooling openings having a third aggregate cross-sectional area and a second shroud group of cooling openings having a fourth aggregate cross-sectional area, said third aggregate cross-sectional area is larger than said fourth aggregate cross-sectional area, said cooling openings configured to discharge cooling fluid therefrom at an oblique angle with respect to a centerline of a gap defined between said outer band aft flange and said shroud assembly leading edge.

17. A gas turbine engine in accordance with claim 16 wherein said first group of cooling openings and said first shroud group of cooling openings include a plurality of cooling openings having a first diameter.

18. A gas turbine engine in accordance with claim 17 wherein said second group of cooling openings and said second shroud group of cooling openings include a plurality of cooling openings having a second diameter, said first diameter is larger than said second diameter.

19. A gas turbine engine in accordance with claim 16 wherein said first group of cooling openings facilitates reducing hot gas ingestion into a gap defined between said outer band aft flange and said shroud assembly leading edge.

20. A gas turbine engine in accordance with claim 16 wherein said first group of cooling openings and said first shroud group of cooling openings facilitate film cooling of said shroud inner surface.

* * * * *